United States Patent
Liao et al.

(10) Patent No.: US 8,654,669 B2
(45) Date of Patent: Feb. 18, 2014

(54) PACKET RECEIVER AND PACKET PROCESSING METHOD THEREOF

(75) Inventors: Yi-Ying Liao, Taipei (TW); Ko-Yin Lai, Hsinchu County (TW); Wei-Hung Liu, Hsinchu County (TW); Tung-Sheng Lin, Taoyuan County (TW); Tai-Lai Tung, Hsinchu County (TW)

(73) Assignee: MStar Semiconductor, Inc., Hsinchu County (TW)

( * ) Notice: Subject to any disclaimer, the term of this patent is extended or adjusted under 35 U.S.C. 154(b) by 153 days.

(21) Appl. No.: 13/432,103

(22) Filed: Mar. 28, 2012

(65) Prior Publication Data

US 2013/0148518 A1   Jun. 13, 2013

(30) Foreign Application Priority Data

Dec. 7, 2011 (TW) .............................. 100145161 A (51) Int. Cl.
*H04L 12/26* (2006.01)

(52) U.S. Cl.
USPC ............................ 370/252; 370/350; 370/464

(58) Field of Classification Search
USPC ........................................................ 370/252
See application file for complete search history.

(56) References Cited

U.S. PATENT DOCUMENTS

| | | | | |
|---|---|---|---|---|
| 5,953,489 | A * | 9/1999 | Park | 386/241 |
| 6,195,368 | B1 * | 2/2001 | Gratacap | 370/535 |
| 6,728,270 | B1 * | 4/2004 | Meggers et al. | 370/514 |
| 6,876,670 | B1 * | 4/2005 | Budrikis et al. | 370/474 |
| 7,843,969 | B2 * | 11/2010 | Bargauan | 370/486 |
| 8,089,979 | B2 * | 1/2012 | Yoshida et al. | 370/419 |
| 8,230,288 | B2 * | 7/2012 | Kwon et al. | 714/748 |
| 8,356,108 | B2 * | 1/2013 | Agarwal et al. | 709/231 |
| 8,363,549 | B1 * | 1/2013 | Zhu et al. | 370/235 |
| 2004/0105393 | A1 * | 6/2004 | Ronneke et al. | 370/252 |
| 2007/0041329 | A1 * | 2/2007 | Schine | 370/250 |
| 2008/0307470 | A1 * | 12/2008 | Kanayama | 725/100 |
| 2009/0083606 | A1 * | 3/2009 | Choi et al. | 714/776 |
| 2009/0122714 | A1 * | 5/2009 | Kato | 370/252 |
| 2010/0260062 | A1 * | 10/2010 | Senga et al. | 370/252 |
| 2010/0284472 | A1 * | 11/2010 | Liao et al. | 375/240.26 |
| 2011/0243022 | A1 * | 10/2011 | Tandai et al. | 370/252 |
| 2011/0310764 | A1 * | 12/2011 | Ramalho | 370/252 |
| 2013/0114423 | A1 * | 5/2013 | Nicolas | 370/252 |
| 2013/0117463 | A1 * | 5/2013 | Agarwal et al. | 709/231 |

* cited by examiner

*Primary Examiner* — Ian N Moore
*Assistant Examiner* — Lakeram Jangbahadur
(74) *Attorney, Agent, or Firm* — WPAT, PC; Justin King (57) ABSTRACT

A packet processing method applied in a packet receiver is provided. An approximate bit rate is first determined according to time stamps of two different packets. The approximate bit rate is corrected according to a time stamp of another packet to generate a fine-tuned bit rate. According to the fine-tuned bit rate, one or more subsequent packets are read out from a buffer. The time stamp of a subsequent packet is provided according to the approximate bit rate.

15 Claims, 8 Drawing Sheets

PACKET RECEIVER AND PACKET PROCESSING METHOD THEREOF

This application claims the benefit of Taiwan application Serial No. 100145161, filed Dec. 7, 2011, the subject matter of which is incorporated herein by reference.

BACKGROUND OF THE INVENTION

1. Field of the Invention

The invention relates in general to a wireless transmission technique, and more particularly, to a technique for determining a packet output rate according to a time stamp.

2. Description of the Related Art

Figure 1:
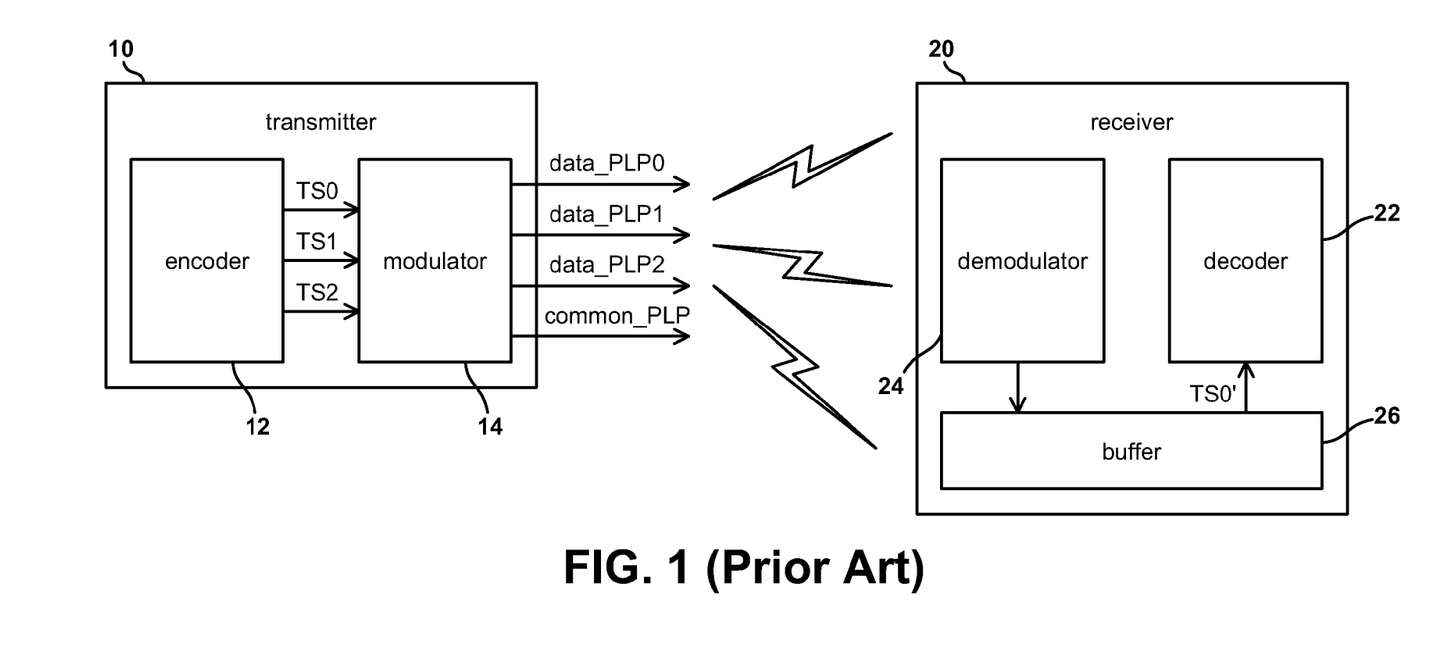
FIG. 1 is a schematic diagram of a relationship between DVB-T2 wireless transmitter/receiver adopting the MPEG-2 standard.

With advancements in communication techniques, digital television broadcasting gradually matures with time. The digital video broadcasting-second generation terrestrial (DVB-T2) is a very prevalent standard in digital television broadcastings. The DVB-T2 includes three video encoding methods—MPEG-2, H.264/MPEG-4 AVC, and AVS (Audio Video Standard). FIG. 1 shows a schematic diagram of a relationship between DVB-T2 wireless transmitter and receiver adopting the MPEG-2 standard.

A transmitter 10 comprises an encoder 12 and a modulator 14. A receiver 20 comprises a decoder 22, a demodulator 24, and a buffer 24. In this example, the encoder 12 encodes data corresponding to three different program channels to respectively generate three transport streams TS0, TS1, and TS2, each containing multiple packets. As shown in FIG. 1, the modulator 14 divides the transport streams into data streams data_PLP0, data_PLP1, data_PLP2, and common_PLP. The data stream common_PLP consists of common data packets of the transport streams TS0, TS1, and TS2. The data streams data_PLP0, data_PLP1, and dataPLP2 respectively comprise data packets excluding common data packets and null packets of the transport streams TS0 to TS2. By arranging the common packets in the data stream common_PLP, bandwidth consumed for repeatedly transmitting the same packets can be saved.

To assist the receiver 20 in correctly restoring the transport streams, the transmitter 10 selectively adds an input stream time reference (ISCR) to every packet or certain packets when generating the data packets. In practice, the modulator 14 may further include a counter. Each time a packet transmitted from the encoder 12 is received, the modulator 14 writes a current count of the counter to the ISCR of the packet.

Assuming a user at the receiver 20 selects to watch a program channel corresponding to the transport stream TS0, the demodulator 24 combines the data streams data_PLP0 and the common_PLP to generate a restored transport stream TS0', which is then decoded by the decoder 22. As shown in FIG. 1, demodulated data packets are first stored in the buffer 26 before being forwarded to the decoder 22. In order to correctly reconstruct the transport stream TS0', it is necessary that the receiver 20 first determine a bit rate for reading the packets from the buffer 26 according to the ISCR recorded in the packets.

SUMMARY OF THE INVENTION

To meet the requirement above, the invention is directed to a circuit structure for determining a packet reading rate according to a time stamp of a packet and an associated packet processing method. Apart from determining an approximate bit rate according to time stamps of earlier packets, time stamps of subsequent packets may also be utilized for consistently correcting the packet reading rate to optimize the accuracy of the packet reading rate. It should be noted that, the concept of the present invention is applicable to various situations where a packet reading rate is determined according to time stamps rather than being limited to an application of an MPEG-2 DVB-T2 receiver system.

According to an embodiment the present invention, a packet processing method applied in a packet receiver is provided. The method comprises steps of: determining an approximate bit rate according to a first time stamp of a first packet and a second time stamp of a second packet, correcting the approximate bit rate according to at least a third time stamp of a third packet to generate a fine-tuned bit rate, and accessing a fourth packet according to the fine-tuned bit rate. The second packet is received subsequent to the first packet, the third packet is received subsequent to the second packet, and the fourth packet is received subsequent to the third packet.

According to another embodiment of the present invention, a packet receiver is provided. The packet receiver comprises a buffer, a coarse estimation module, a fine tuning module, and a control module. The buffer temporarily stores at least one packet. The coarse estimation module determines an approximate bit rate according to a first time stamp of a first packet and a second time stamp of a second packet. The fine tuning module corrects the approximate bit rate according to at least a third time stamp of a third packet to generate a fine-tuned bit rate. The control module controls the buffer to output a fourth packet according to the fine-tuned bit rate. The second packet is received subsequent to the first packet, the third packet is received subsequent to the second packet, and the fourth packet is received subsequent to the third packet.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
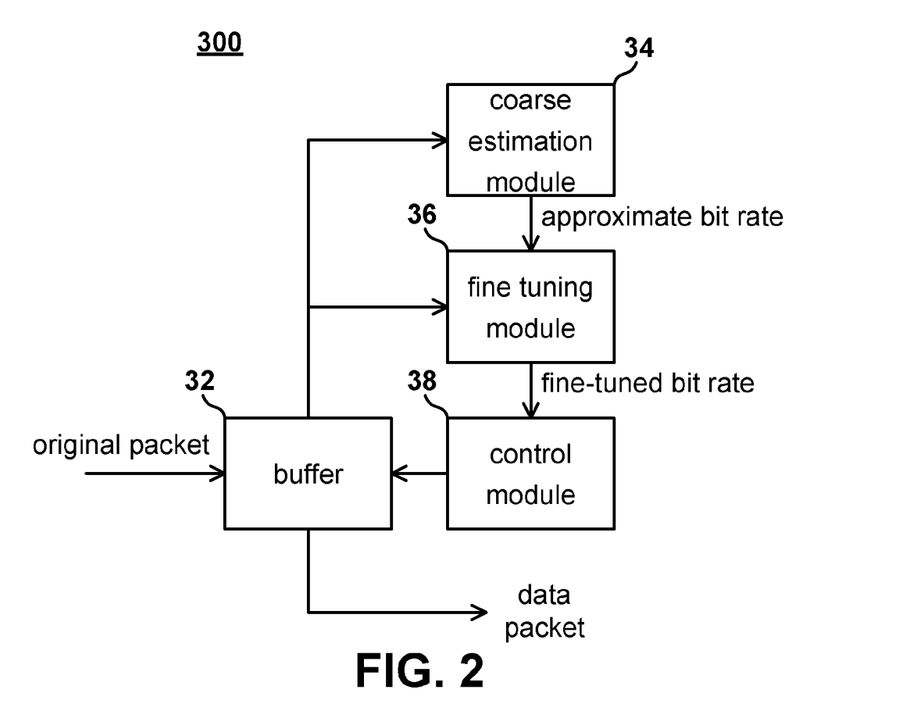
FIG. 2 is a schematic diagram of a packet receiver according to an embodiment of the present invention.

FIG. 2 shows a packet receiver 300 according an embodiment of the present invention. The packet receiver 300 comprises a buffer 32, a coarse estimation module 34, a fine tuning module 36, and a control module 38. In the descriptions below, the packet receiver 300 located in a receiving end of a DVB-T2 digital television is taken as an example, rather than limiting the present invention thereto. In this embodiment, the buffer 32 temporarily stores demodulated original packets of a predetermined transport stream TS, with one or several of the demodulated original packets having an input stream time reference (ISCR), i.e., having a reference time stamp provided by a transmission end. The coarse estimation module 34, the fine tuning module 36, and the control module 38 are principally utilized for determining a fine-tuned bit rate according to the time stamps. Subsequently, the buffer 32 output data packets with reference to the fine-tuned bit rate.

Figure 3:
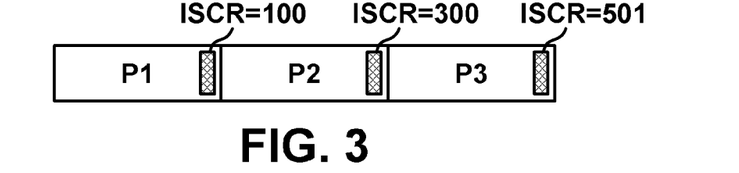
FIG. 3 is a schematic diagram illustrating a relationship of packets.

The coarse estimation module 34 first estimates an approximate bit rate according to packets received earlier by the packet receiver 300. In practice, a duty cycle T of a counter for generating the ISCR at the transmission end is known. The coarse estimation module 34 then calculates the approximate bit rate in a unit of the duty cycle T. Referring to FIG. 3, assuming the ISCR values of two successive first packet P1 and second packet P2 are respectively 100 and 300, inferring that a time point when the buffer 32 outputs the packet P2 and a time point when the buffer outputs the packet P1 is spaced by 200 duty cycles T. By further considering the number of packets between the first packet P1 and second packet P2, the coarse estimation module 34 obtains the approximate bit rate. For example, assuming between the packets P1 and P2 are four null packets or data packets not carrying ISCR, the approximate bit rate is an inverse value of [(300−100)*T]/5, i.e., 1/(40*T). Based on the above concept of the ISCR of two packets, the coarse estimation module 34 may derive the approximate bit rate. It should be noted that, it is possible that other packets exist between the packets P1 and P2 or between the packets P2 and P3, or the packets P1 and P2 or the packets P2 and P3 may be two successive packets.

In practice, a deviation is likely to occur with the approximate bit rate determined solely based on two ISCR values. For example, the count of the counter for generating the ISCR is generally an integer. However, the interval between two packets is not always an integer multiple of the duty cycle T. Consequently, the approximate bit rate estimated according to the approach above is not an actual bit rate, and an accumulated deviation inevitably gets larger as the buffer 32 outputs subsequent packets only based on the approximate bit rate. For example, assuming that the approximate bit rate indicates an interval between outputting time points of two packets is 10T, where in fact an actual interval is 10.1T. After outputting ten packets according to the approximate bit rate, the accumulated deviation in the output time reaches 1T. In other words, a time point at which the buffer 32 outputs an 11$^{th}$ packet is earlier than the correct time by 1T.

Figure 4A:
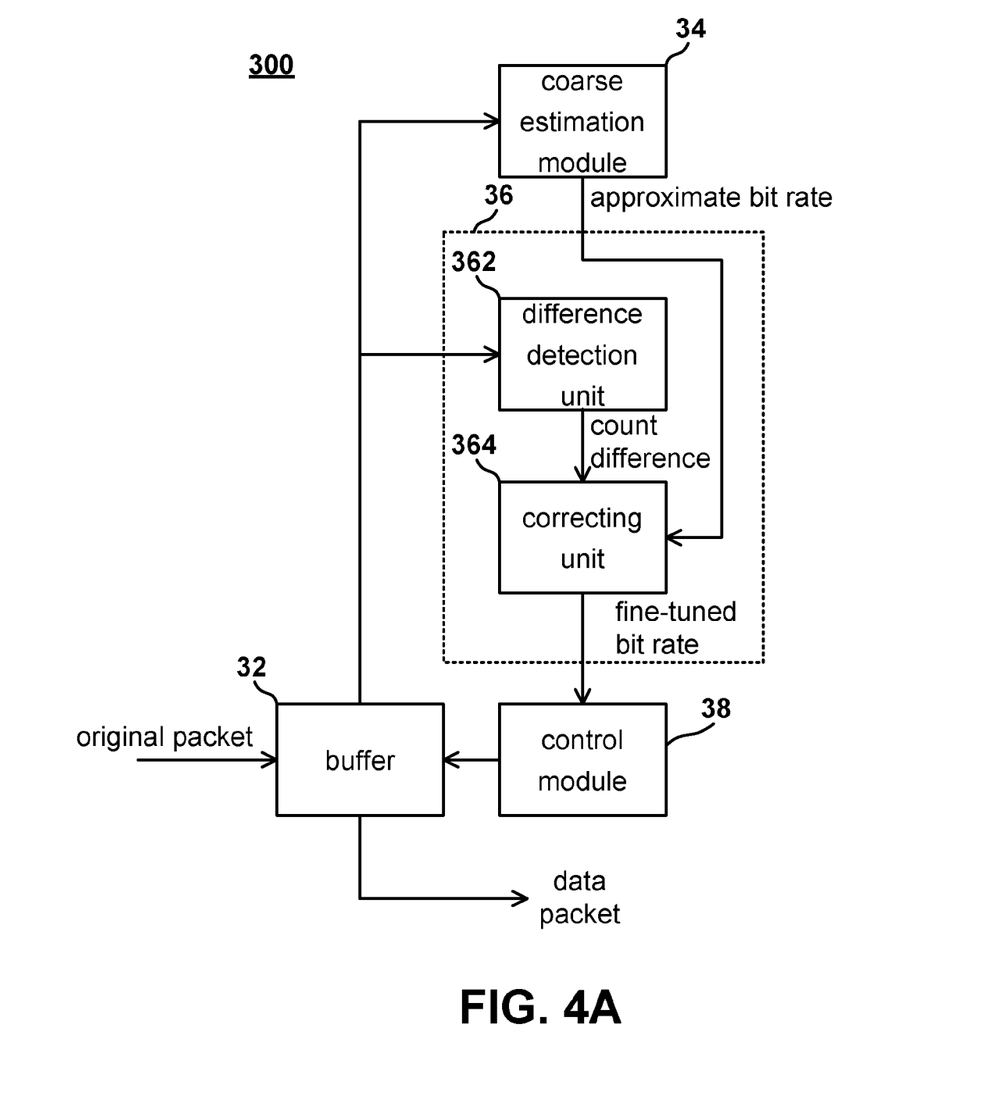
FIG. 4A is a schematic diagram of an example of a fine tuning module.

Referring to FIG. 2, the approximate bit rate generated by the coarse estimation module 34 is transmitted to the fine tuning module 36. The fine tuning module 36 tunes the approximate bit rate according to the ISCR value carried in at least one other packet (e.g., the third packet P3 in FIG. 3) to generate a fine-tuned bit rate. FIG. 4A shows a detailed schematic diagram of an example of the fine tuning module 36.

In this example, the fine tuning module 36 comprises a difference detection unit 362 and a correcting unit 364. The packet P3 and its ISCR value are originally stored in the buffer 32. As shown in FIG. 4A, the approximate bit rate generated by the coarse estimation module 34 according to the ISCR in the packets P1 and P2 is provided to the correcting unit 364. The correcting unit 34 provides a fine-tuned bit rate to the control module 38, which then determines the time point at which the ISCR of the packet P3 is provided to the difference detection unit 362. It should be noted that, before generating a (first) bit rate correction value, the correcting unit 364 directly provides the approximate bit rate to the control module 38. After generating the (first) bit rate correction value, the correcting unit 364 provides the fine-tuned bit rate to the control module 38. Taking FIG. 3 for example, the approximate bit rate is 1/(200*T). Therefore, before generating the (first) fine-tuned bit rate, at a time point of a count 200*T after the packet P2 is outputted by the buffer 32, the control module 38 controls the buffer 32 to provide the ISCR of the packet P3 to the difference detection unit 362. According to the approximate bit rate, it is calculated that the ISCR of the packet P3 is the ISCR 300 in the packet P2 added with 200, i.e., 500.

In this example, the ISCR written into the packet P3 is in fact 501 rather than 500. The difference detection unit 362 subtracts a receiver count 500 (generating process of which is to be described shortly) from the actual ISCR (also referred to as a transmitter count) of the packet P3 to determine the difference between the two counts is 1. When the count difference is a positive number, it means that the approximate bit rate is too large and should be decreased. Conversely, when the count difference is a negative number, it means the approximate bit rate is too low and should be increased. The correcting unit 364 generates a bit rate correction value according to the count difference, and corrects the approximate bit rate according to the bit rate correction value.

Figure 4B:
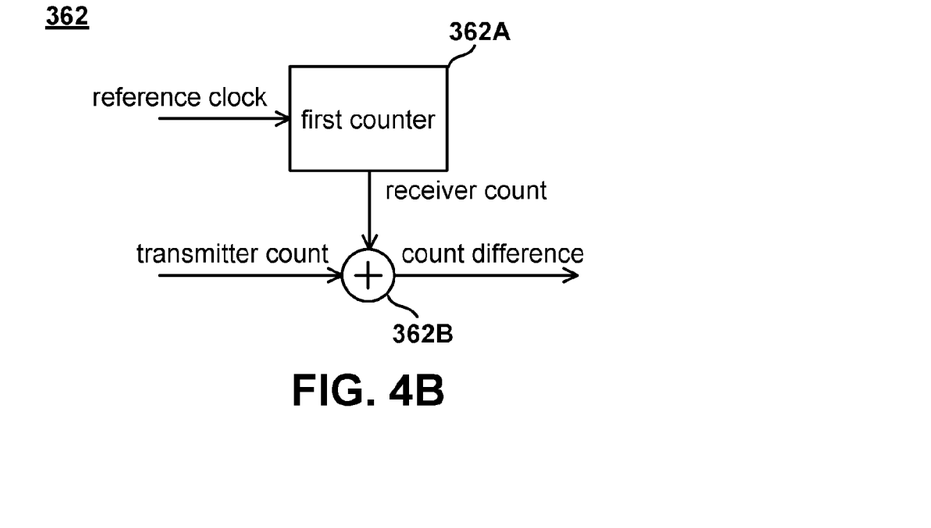
FIG. 4B is a schematic diagram of an example of a difference detection unit.

FIG. 4B shows a detailed schematic diagram of an example of the difference detection unit 362. In this example, the difference detection unit 362 comprises a first counter 362A and a subtractor 362B. The ISCR of the packet P2 may serve as an initial count of the first counter 362A. Taking FIG. 3 for example, the first counter 362A may count up from an initial value of 300, and adds 1 for every reference cycle T provided by a reference clock. As shown in FIG. 4B, the first counter 362A receives the reference clock as a count reference, with the cycle of the reference clock being T. As previously stated, after the time point 200*T, the control module 38 controls the buffer 32 to provide the ISCR of the packet P3 to the difference detection unit 362. The difference detection unit 362 regards a count result while receiving the ISCR of the packet P3 as the receiver count. Thus, the receiver count is 500. The subtractor 362B subtracts the receiver count from the transmitter count (i.e., the actual ISCR of the packet P3) to determine a count difference.

In an embodiment, the first counter 362A continues to count up from 500 after generating the count difference. In another embodiment, the difference detection unit 362 utilizes the transmitter count (i.e., the ISCR value used for comparison) transmitted from the buffer 32 after generating the count difference. Taking FIG. 3 for example, after generating the count difference, the difference detection unit 362 prompts the first counter 362A to update the initial count to the ISCR of 501 in the packet P3. Similarly, each time a new ISCR occurs, the initial count of the first counter 362A may be updated. Such an approach offers an advantage that the convergence process for approximating to the actual bit rate from the approximate bit rate is more stable with less oscillation while also having a faster convergence speed.

Figure 5A:
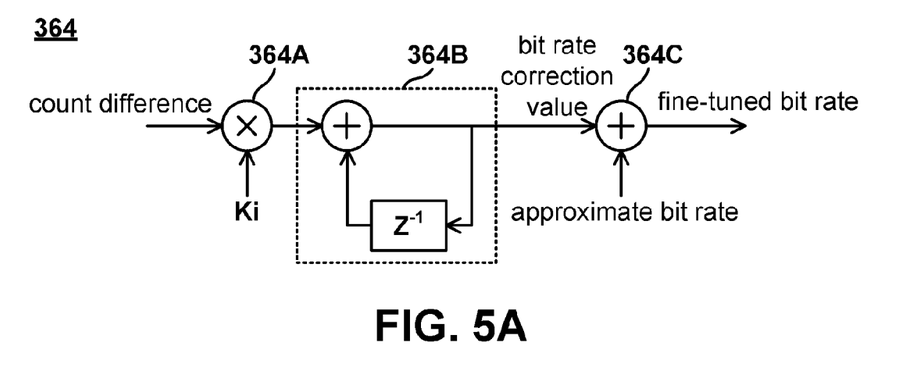
FIGS. 5A and 5B are schematic diagrams of two examples of a correcting unit.

FIG. 5A shows a detailed schematic diagram of the correcting unit 364. In this embodiment, the correcting unit 364 comprises a first multiplier 364A, an integrator 364B, a frequency converter (not shown), and an adder 364C. The first multiplier 364A multiplies the count difference by a first ratio Ki to generate a first multiplication result. The integrator 364B accumulates the first multiplication result for a time correction value. The first ratio Ki is not limited to a specific value, and may be 1. The frequency converter inverts the approximate bit rate to generate an approximate packet interval. The adder 364C adds up the approximate packet interval and the time correction value, and inverts the sum to generate a fine-tuned bit rate. In practice, the fine-tuned bit rate is not necessarily processed in the time domain, but may also be processed in the frequency domain as long as an inverse value of the sum of the approximate packet interval and the time correction value can be obtained. That is to say, the fine-tuned bit rate obtained in the frequency domain must be substantially the same as the fine-tuned bit rate obtained in the time domain of this embodiment. In other words, the correcting unit 364 does not necessarily comprise a frequency converter, and details of this embodiment are for illustrative purposes rather than being construed as limitations of the present invention.

Figure 5B:
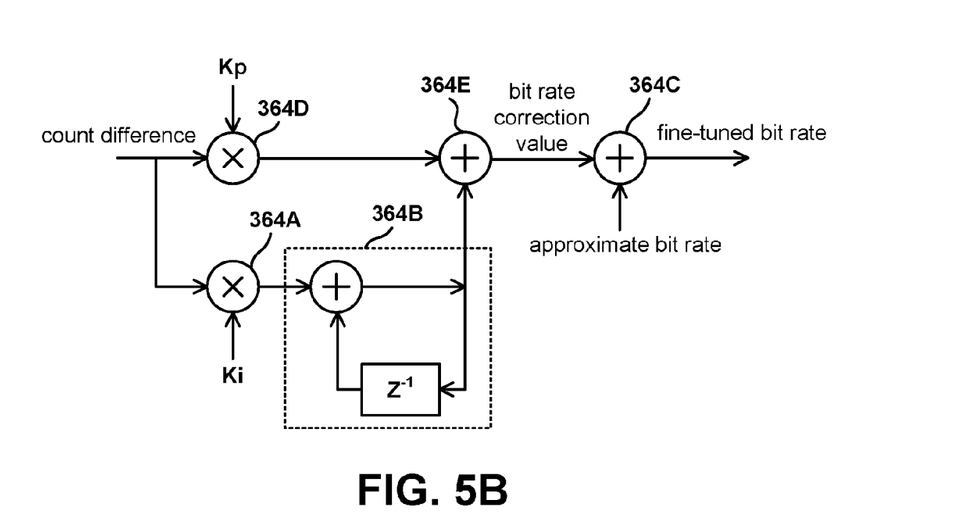

FIG. 5B shows a detailed schematic diagram of another example of the correcting unit 364. In this example, the correcting unit 364 further comprises a second multiplier 364D and an adder 364E. The second multiplier 364D multiples the count difference by a second ratio Kp to generate a second multiplication result. The adder 364E adds up the accumulated result outputted by the integrator 364B and the second multiplication result to generate the time correction value. It can be seen from the two examples above that, when the bit rate correction value is 0, the correcting unit 364 provides the approximate bit rate to the control module 38. In practice, the first ratio Ki and the second ratio Kp are not limited to specific numbers.

Figure 6:
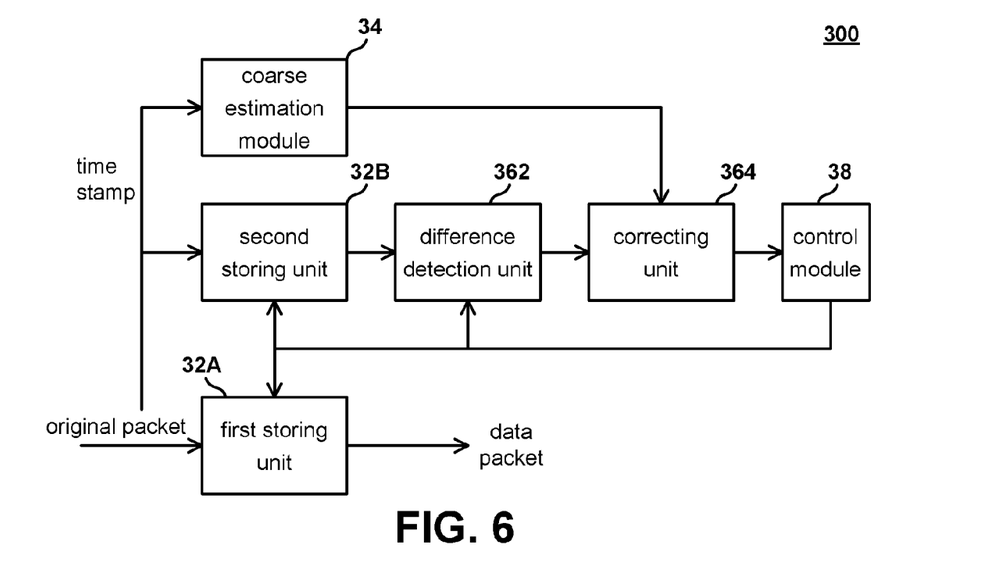
FIG. 6 is a schematic diagram of an example of a packet receiver of the present invention.

FIG. 6 shows a schematic diagram of an embodiment of the packet receiver 300. In this embodiment, the buffer 32 comprises a first storing unit 32A for storing packet data, and a second storing unit 32B for storing time stamps (ISCR) of the packets. For example, the two storing units can be first-in-first-out (FIFO) memories. As previously stated, the coarse estimation module 34 first estimates an approximate bit rate according to ISCR in earlier packets. Taking the packets shown in FIG. 3 for example, after receiving the ISCR in the packets P1 and P2, the coarse estimation module 34 generates an approximate bit rate and provides the approximate bit rate to the correcting unit 364. Before generating the bit rate correction value, the correcting unit 364 directly provides the approximate bit rate to the control module 38. After generating the (first) bit rate correction value, the correcting unit 364 provides the fine-tuned bit rate to the control module 38.

The control module 38 generates a control signal according to the bit rate provided by the correcting unit 364, and provides the control signal to the first storing unit 32A, the second storing unit 32B, and the difference detection unit 362. In practice, the above circuits may be triggered by a voltage rising edge in the control signal to perform a subsequent operation. More specifically, the first storing unit 32A may output packet data each time being triggered by a voltage rising edge in the control signal. Assuming the packet data outputted by the first storing unit 32A carries an ISCR, the second storing unit 32B correspondingly outputs the ISCR of the packet at the same voltage rising edge in the control signal. For example, as the first storing unit 32A outputs the packet P3, the second storing unit 32B transmits the ISCR of the packet P3 to the difference detection unit 362.

The difference detection unit 362 determines whether a new ISCR is inputted each time a voltage rising edge occurs in the control signal. When a determination result is affirmative, the difference detection unit 362 calculates a difference between the ISCR (the transmitter count) and the receiver count, and provides the count difference to the correcting unit 364. The correcting unit 364 utilizes the count difference as a basis for generating the fine-tuned bit rate. Upon receiving the fine-tuned bit rate, the control module 38 generates the above control signal according to the new bit rate.

In an embodiment, the control module 38 comprises a second counter, and the fine-tuned bit rate corresponds to an initial count of the second counter. The second counter counts downwards from the initial count, periodically. That is, the second counter subtracts 1 for every one reference cycle from the initial count to generate an intermediate count. Similarly, the reference cycle may be provided by the reference clock. For example, the second counter may be realized by a numerically-controlled oscillator (NCO). Taking a situation of the approximate bit rate being $1/(5*T)$ and the time correction value being 0.3 for example, the initial count equals 5.3. The second counter counts downwards from 5.3, such that the above intermediate count sequentially changes from 5.3, 4.3, 3.3, 2.3, 1.3 to 0.3. Each time the intermediate count becomes smaller than 1, the second counter subtracts 1 from and adds the initial count to the intermediate count to generate a new count. Therefore, when the intermediate count is decreased to 0.3, the new count is 0.3−1+5.3 to equal 4.6.

Figure 7:
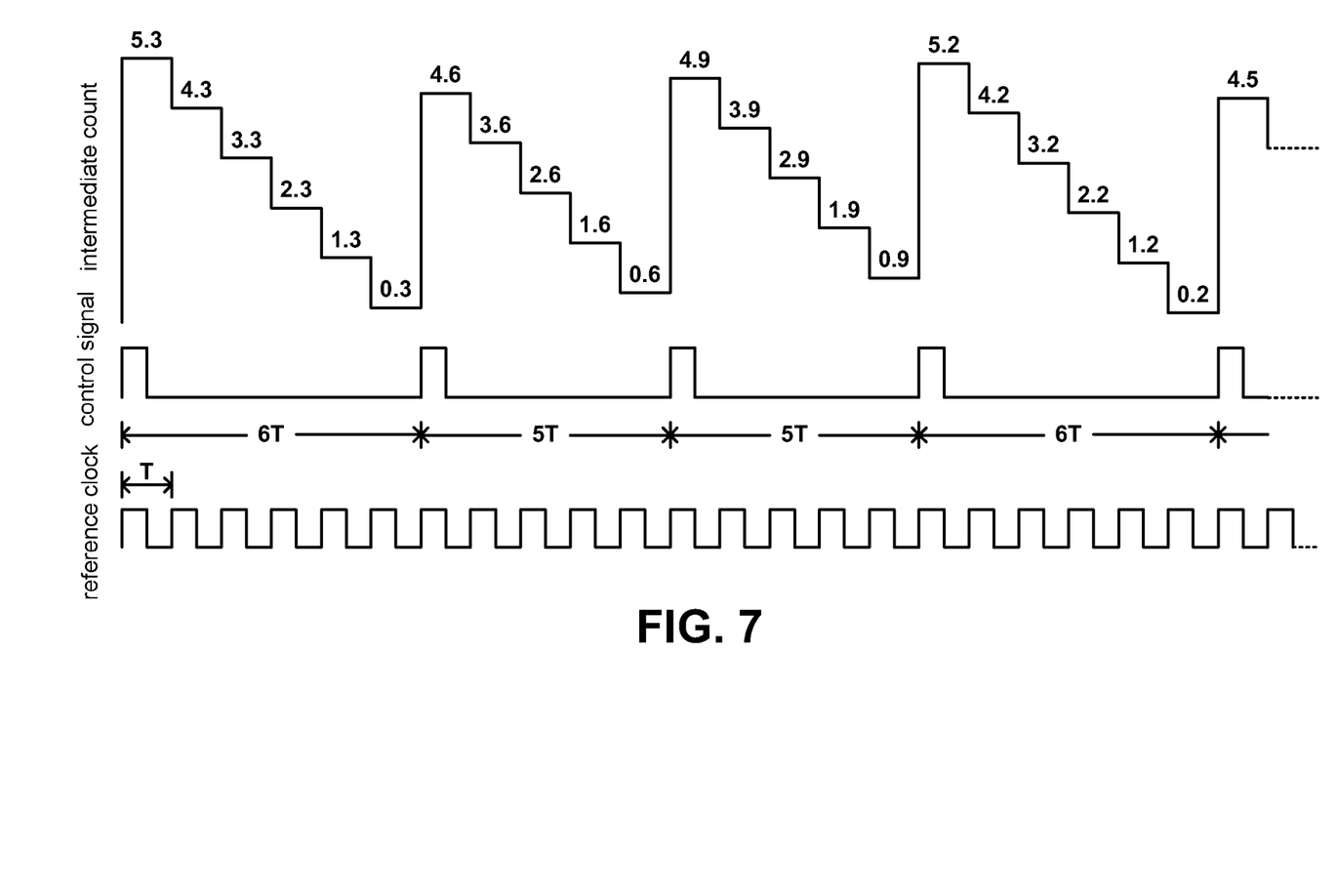
FIG. 7 is a timing diagram of an intermediate count and a control signal.

FIG. 7 shows a timing diagram of the intermediate count and the control signal. As shown in FIG. 7, one reference cycle after the intermediate count is smaller than 1, the second counter prompts the control signal to a high-level pulse for triggering the first storing unit 32A, the second storing unit 32B, and the difference detection unit 362. Further, one reference cycle T after the intermediate count is smaller than 1, the second counter starts to count downwards from a new count. Taking the new count as 4.6 for example, the intermediate count sequentially changes from 4.6, 3.6, 2.6, 1.6 to 0.6. Assuming the new count is 4.9, the intermediate count sequentially changes from 4.9, 3.9, 2.9, 1.9 to 0.9.

Referring to FIG. 7, the first high-level pulse and the second high-level pulse is spaced by 6T, the second high-level pulse and the third high-level pulse is spaced by 5T, and the third high-level pulse and the fourth high-level pulse is also spaced by 5T. In practice, assuming the fine-tuned bit rate is fixed at $1/(5.3*T)$, an average cycle for a high-level pulse in the control signal is correspondingly 5.3T in the long term. That is to say, an average bit rate at which the first storing unit 32A output packets is $1/(5.3*T)$. Such an approach ensures the accuracy of packet accessing rate in the long term, and is therefore appropriate while accuracy to output a packet each time is less of a concern. Therefore, the embodiment above is advantageous because it is capable of more frequently generating the fine-tuned bit rate that more closely follows the bit rate at the transmitting end.

Figure 8:
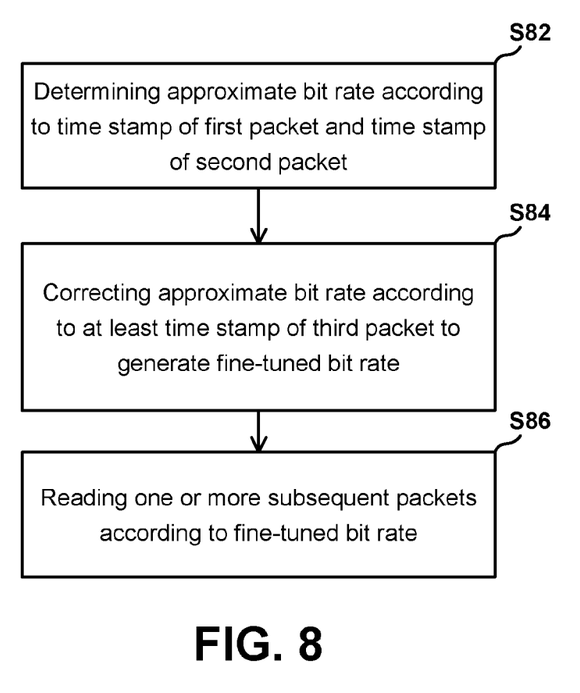
FIGS. 8 and 9 are flowcharts of a packet processing method according to an embodiment of the present invention.

FIG. 8 shows a flowchart of a packet processing method according to another embodiment of the present invention. In Step S82, an approximate bit rate is determined according to a first time stamp of a first packet and a second time stamp of a second packet. In Step S84, the approximate bit rate is corrected at least according to a third time stamp of a third packet to generate a fine-tuned bit rate. The third time stamp is provided according to the approximate bit rate. In Step S86, one or more subsequent packets are read according to the fine-tuned bit rate.

Figure 9:
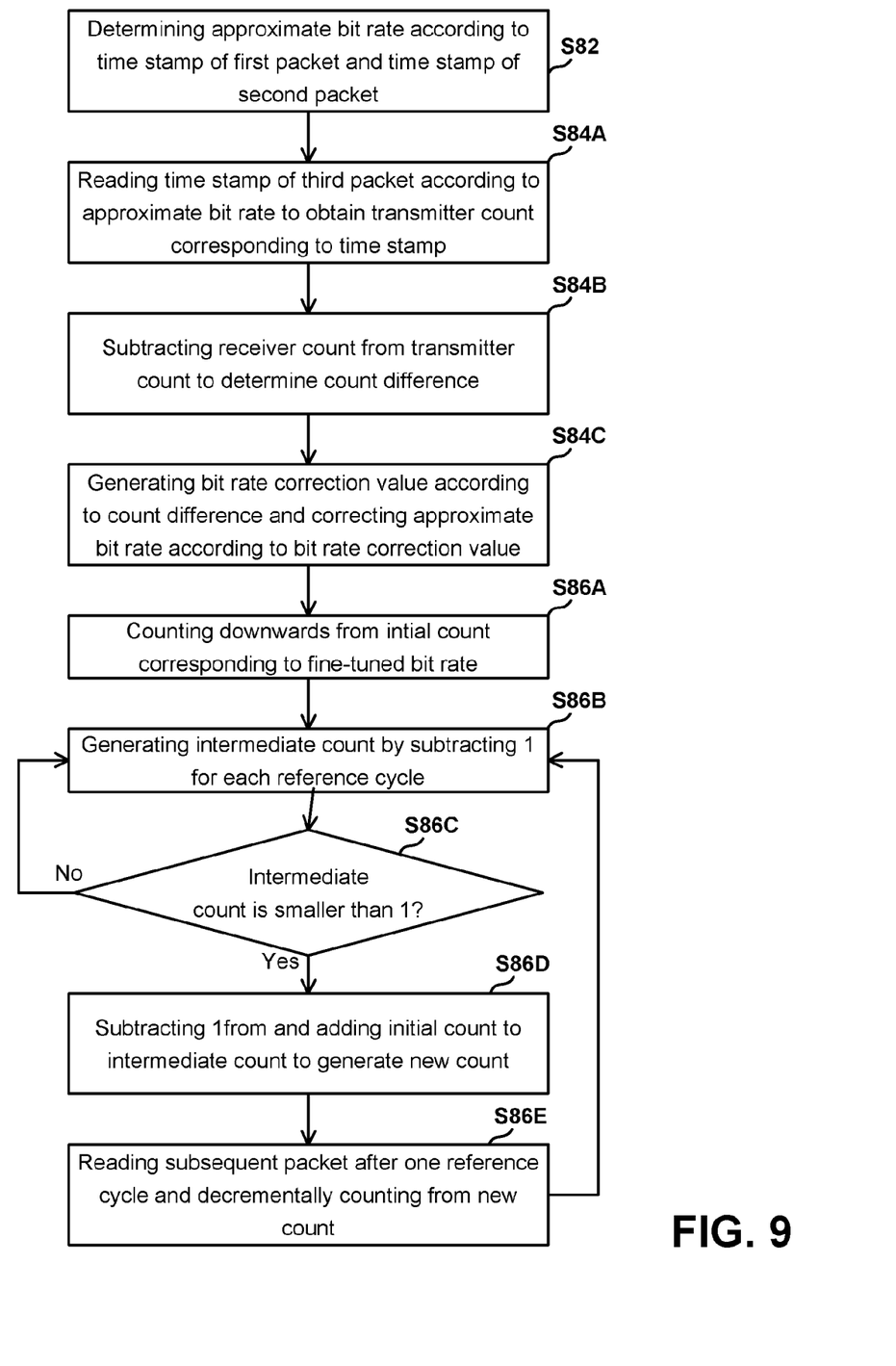

Referring to FIG. 9, Step S84 may comprise three sub-steps. In Step S84A, the third time stamp is read according to the approximate bit rate. In Step S84B, a receiver count is subtracted from the third time stamp to determine a count difference. The receiver count is associated with the second time stamp. In Step 84C, a bit rate correction value is generated according to the count difference, and the approximate bit rate is corrected according to the bit rate correction value.

Further, Step S86 may also comprise five sub-steps. In Step 86A, an initial count corresponding to the fine-tuned bit rate is counted downwards. In Step S86B, an intermediate count is generated by subtracting 1 for every reference cycle. In Step S86C, it is determined whether a current intermediate count is smaller than 1. When a determination result in Step S86C is negative, the method iterates Step S86B to continue counting downwards. When the determination result in Step S86C is affirmative, Step S86D is performed to subtract 1 from and add the initial count to the current intermediate count smaller than 1 to generate a new count. In Step S86E, after the intermediate count is smaller than 1 for one reference cycle, a subsequent packet is read and the new count is counted downwards. The method iterates Step S86B after Step S86E to again start counting downwards.

It should be noted that, details of the circuits given in the description of the packet receiver 300 and associated modifications may also be applied to the packet processing method in FIGS. 8 and 9, and is omitted herein.

Accordingly, a circuit structure for determining a packet reading rate according to time stamps and an associated packet processing method are disclosed by the present invention. Apart from determining an approximate bit rate according to time stamps of earlier packets, time stamps of subsequent packets may also be utilized for consistently correcting the packet reading rate to optimize the accuracy of the packet reading rate. It should be noted that, the concept of the present invention is applicable to various situations where a packet reading rate is determined according to time stamps rather than being limited to an application of an MPEG-2 DVB-T2 receiver system.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A packet processing method for a packet receiver, comprising:
   a) determining an approximate bit rate according to a first time stamp of a first packet and a second time stamp of a second packet;
   b) generating a fine-tuned bit rate according to a third time stamp of a third packet and the approximate bit rate, comprising:
      b1) accessing the third time stamp according to the approximate bit rate;
      b2) subtracting a receiver count from the third time stamp to determine a count difference, the receiver count corresponding to the second time stamp; and
      b3) generating a bit rate correction value according to the count difference, and generating the fine-tuned bit rate according to the bit rate correction value and the approximate bit rate, comprising:
         multiplying the count difference by a first ratio to generate a first multiplication result;
         accumulating the first multiplication result to generate an accumulation result;
         multiplying the count difference by a second ratio to generate a second multiplication result; and
         adding the accumulation result and the second multiplication result to generate a sum, and generating the bit rate correction value according to the sum; and
   c) accessing a fourth packet according to the fine-tuned bit rate;

wherein, the second packet is received subsequent to the first packet, the third packet is received subsequent to the second packet, and the fourth packet is received subsequent to the third packet.

2. The packet processing method according to claim 1, comprising: counting up from a first count according to a reference cycle to generate a count, the first count corresponding to the second time stamp; and
selecting the count as the receiver count when the third packet is accessed.

3. The packet processing method according to claim 2, further comprising:
replacing the first count with the third time stamp after the count difference is generated.

4. The packet processing method according to claim 1, wherein the step of generating a bit rate correction value further comprises:
multiplying the count difference by a first ratio to generate a first multiplication result; and
accumulating the first multiplication result, and generating the bit rate correction value according to the first multiplication result.

5. The packet processing method according to claim 1, wherein the fine-tuned bit rate corresponds to an initial count, and the step of accessing a fourth packet further comprises:
   c1) counting downwards from the initial value according to a reference cycle to generate an intermediate count;
   c2) when the intermediate count is smaller than 1, subtracting 1 from the intermediate count and adding the initial count to the intermediate count after subtracting, to accordingly generate a new count; and
   c3) accessing the fourth packet and replacing the initial count with the new count after the intermediate count is smaller than 1 for one reference cycle.

6. A packet receiver, comprising:
a buffer, for temporarily storing a packet;
a coarse estimation module, for determining an approximate bit rate according to a first time stamp of a first packet and a second time stamp of a second packet;
a fine tuning module, for generating a fine-tuned bit rate according to a third time stamp of a third packet and the approximate bit rate, comprising:
   a difference detection circuit, for subtracting a receiver count from the third time stamp to determine a count difference, the receiver count corresponding to the second time stamp; and
   a correcting unit, for generating a bit rate correction value according to the count difference, and generating the fine-tuned bit rate according to the bit rate correction value and the approximate bit rate, comprising:
      a first multiplier, for multiplying the count difference by a first ratio to generate a first multiplication result;
      an integrator, for accumulating the first multiplication result to generate an accumulation result;
      a second multiplier, for multiplying the count difference by a second ratio to generate a second multiplication result;
      an adder, for adding the accumulation result and the second multiplication result to generate a sum; and
      an operating unit, for generating the fine-tuned bit rate according to the approximate bit rate and the sum; and
a control module, for controlling the buffer to output a fourth packet according to the fine-tuned bit rate;
wherein, the second packet is received subsequent to the first packet, the third packet is received subsequent to the second packet, the fourth packet is received subsequent to the third packet, and the third time stamp is accessed from the buffer according to the approximate bit rate.

7. The packet receiver according to claim 6, wherein the difference detection unit comprises:
   a first counter, for counting up from the first count according to a reference cycle to generate a count, the first count corresponding to the second time point, the count being the receiver count when the third packet is accessed from the buffer; and
   a subtractor, for subtracting the receiver count from the third time stamp to determine the count difference.

8. The packet receiver according to claim 6, wherein the difference detection unit replaces the first count with the third time stamp after generating the count difference.

9. The packet receiver according to claim 6, wherein the correcting unit comprises:
   a first multiplier, for multiplying the count difference by a first ratio to generate a first multiplication result;
   an integrator, for accumulating the first multiplication result; and
   an operating unit, for generating the fine-tuned bit rate according to the approximate bit rate and the first multiplication result.

10. The packet receiver according to claim 6, wherein the fine-tuned bit rate corresponds to an initial count, and the control module comprises:
    a second counter, for counting downwards from the initial count according to a reference cycle to generate an intermediate count; subtracting 1 from the intermediate count and adding the initial count to the intermediate count after subtracting, when the intermediate count is smaller than 1, to accordingly generate a new count; and controlling the buffer to output the fourth packet and replacing the initial count with the new count after the intermediate count is smaller than 1 for one reference cycle.

11. A packet processing method for a packet receiver, comprising:
    determining an approximate bit rate according to a first time stamp of a first packet and a second time stamp of a second packet;
    using the approximate bit rate to read a third time stamp of a third packet;
    generating a fine-tuned bit rate by correcting the approximate bit rate according to the third time stamp of the third packet;
    accessing the third time stamp according to the approximate bit rate;
    subtracting a receiver count from the third time stamp to determine a count difference, the receiver count corresponding to the second time stamp; and
    generating a bit rate correction value according to the count difference, and generating the fine-tuned bit rate according to the bit rate correction value and the approximate bit rate;
    multiplying the count difference by a first ratio to generate a first multiplication result;
    accumulating the first multiplication result to generate an accumulation result;
    multiplying the count difference by a second ratio to generate a second multiplication result;
    adding the accumulation result and the second multiplication result to generate a sum, and generating the bit rate correction value according to the sum; and
    reading one or more subsequent packets according to the fine-tuned bit rate.

12. The packet processing method according to claim 11, further comprising:
    subtracting a receiver count from the third time stamp to determine a count difference, where the receiver count is associated with the second time stamp;
    generating a bit rate correction value according to the count difference;
    correcting the approximate bit rate according to the bit rate correction value.

13. The packet processing method according to claim 12, further comprising:
    decrementing an initial count corresponding to the fine-tuned bit rate; and
    providing reference cycles by a reference clock.

14. The packet processing method according to claim 13, further comprising:
    generating an intermediate count by decrementing the initial count by 1 for each reference cycle;
    determining whether a current intermediate count is less than 1 during each reference cycle; and
    repeating the decrementing of the current intermediate count by 1 for each reference cycle when the current intermediate count is not less than 1.

15. The packet processing method according to claim 14, further comprising:
    generating a new count by decrementing the current intermediate count by 1 and adding the initial count to the intermediate count; and
    reading a subsequent packet and decrementing the new count.

* * * * *